(12) United States Patent
Hoffmann

(10) Patent No.: US 6,747,248 B2
(45) Date of Patent: Jun. 8, 2004

(54) WELDING TORCH AND STREAM NOZZLE

(75) Inventor: Hans Hoffmann, Salzburg (AT)

(73) Assignee: Alexander Binzel Schweisstechnik GmbH & Co. KG, Buseck (DE)

( * ) Notice: Subject to any disclaimer, the term of this patent is extended or adjusted under 35 U.S.C. 154(b) by 0 days.

(21) Appl. No.: 10/169,086

(22) PCT Filed: Jan. 8, 2001

(86) PCT No.: PCT/EP01/00140

§ 371 (c)(1),
(2), (4) Date: Jul. 10, 2002

(87) PCT Pub. No.: WO01/51242

PCT Pub. Date: Jul. 19, 2001

(65) Prior Publication Data

US 2003/0000932 A1 Jan. 2, 2003

(30) Foreign Application Priority Data

Jan. 11, 2000 (AT) .............................................. 27/2000

(51) Int. Cl.⁷ ................................................. B23K 9/28
(52) U.S. Cl. ................................................. 219/137.43
(58) Field of Search ....................... 219/137.43, 137.61

(56) References Cited

U.S. PATENT DOCUMENTS

| | | |
|---|---|---|
| 3,309,492 A | 3/1967 | Fields |
| 3,659,076 A | 4/1972 | Ogden |
| 3,755,648 A | 8/1973 | Rothman et al. |
| 4,158,763 A | 6/1979 | Moerke |
| 5,628,924 A * | 5/1997 | Yoshimitsu et al. ..... 219/121.5 |
| 5,726,414 A * | 3/1998 | Kitahashi et al. ...... 219/121.48 |

FOREIGN PATENT DOCUMENTS

| | | |
|---|---|---|
| CN | 1072699 | 6/1993 |
| DE | 2437776 | 2/1976 |
| DE | 2704553 | 8/1977 |
| DE | 146016 | 1/1981 |
| DE | 239969 | 10/1986 |
| DE | 4401729 A1 | 7/1994 |
| EP | 033312 A1 | 8/1981 |
| EP | 273876 A1 | 7/1988 |
| EP | 544386 A1 | 6/1993 |
| EP | 830915 B1 | 3/1998 |
| EP | 865859 A1 | 9/1998 |

* cited by examiner

Primary Examiner—Kiley Stoner
Assistant Examiner—Len Tran
(74) Attorney, Agent, or Firm—Charles P. Boukus, Jr.

(57) ABSTRACT

The invention relates to a stream nozzle (13) for an inert gas welding torch (B). The inventive nozzle is provided with a coating (S) that adheres to at least a part of the surface of said nozzle in a material fit and consists of silver, especially galvanically mounted contact silver.

15 Claims, 1 Drawing Sheet

WELDING TORCH AND STREAM NOZZLE

Figure 1:
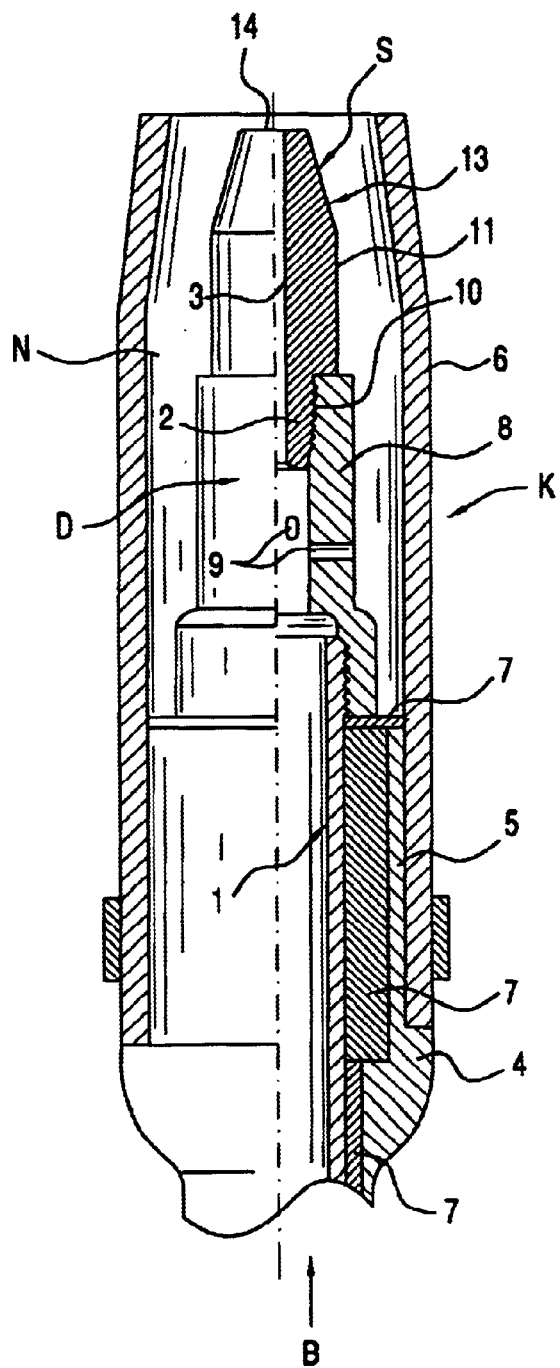

The invention relates to a welding torch as generically defined by the preamble to claim 1 and to a stream nozzle as generically defined by the preamble to claim 8.

The stream nozzle, also known as a contact nozzle, typically comprises electrolyte copper, or a more-wear-resistant copper-chromium-zirconium alloy. Other variant alloys also exist, for instance with beryllium. The task of the stream nozzle is to transmit current to the electrode wire and to guide it. For good process safety, an optimal current transfer from the nozzle stock to the stream nozzle is necessary. Moreover, the stream nozzle must transmit considerable heat over the mounting region. In practice, until now, stream nozzles have predominantly been used without surface treatment, that is, bare or bare to the copper; they are secured replaceably to the nozzle stock via a screw connection or a plug-type connection. In welding, welding beads or welding splashes that occur exhibit the undesired tendency to adhere to the exposed surface of the stream nozzle. This can cause adverse effects on the flow conditions for the inert gas that glows on the outside along the stream nozzle to the welding point. Welding splashes adhering to the end face and in the vicinity of the exit from the electrode wire duct can hinder advancement from friction with the electrode wire. In practice, stream nozzles are therefore known that at least on their jacket face and end face have a metal coating, in the form of chromium- or nickel-plating. This coating is intended to provide improved reflection of the arc radiation (reduced heat consumption) and also to prevent the welding splashes from adhering (anti-adhesive effect). Not only are coatings formed by chromium- or nickel-plating expensive; they do not meet the expectations made of them to a satisfactory extent.

In addition, whenever the coating extends into the mounting region of the stream nozzle, current transfer problems occur; this is suspected to be because the current transfer fluctuates as a function of the layer thickness. In applying the coating, it is therefore necessary that the application region intended for the current transfer be covered as well. This is expensive.

The object of the invention is to disclose a welding torch of the type defined at the outset, and a stream nozzle for this kind of inert gas welding torch, that makes it economically possible to achieve an optimal anti-adhesive and reflective action. A part of the object is also that the metal coating have no adverse influence on the current transfer but instead even improve the current transfer.

The stated object is attained by the characteristics of claim 1 and claim 8, respectively.

Surprisingly, a silver coating leads to excellent anti-adhesion and reflective effects. Even if the silver coating is meant to extend into the mounting region, it has no adverse effect on the current transfer but in fact even improves the current transfer. The heat transfer capability of a silver coating is already optimal. Applying the silver coating can be done economically, particularly in mass production. Since the silver coating has no adverse effect on the current transfer and in fact even improves it, when the coating is applied there is no need to cover regions of the surface that are important for the current transfer. This makes coating the stream nozzle simpler.

Expediently, the coating comprises galvanically or chemically applied contact silver. Contact silver can be applied with the desired layer thickness and good adhesion to the material comprising the contact nozzle at low equipment expense.

The coating should have an essentially uniform layer thickness, preferably between about 6 and 10 $\mu$m.

The silver coating should be uniform, at least on the jacket face and the free end face of the stream nozzle.

However, it is especially expedient for the entire surfaces of the stream nozzles to be provided with the silver coating. This simplifies the procedure in galvanic or chemical coating of the stream nozzle considerably. The silver coating, which is also present in the region of attachment to or contact with the nozzle stock or inner tube of the torch as well, leads to optimal current transfer and heat transfer and makes an important contribution to process safety.

In a stream nozzle with a screw attachment for producing a screw connection to the nozzle stock or the inner tube of the torch, the male thread of the screw attachment is also covered with the silver coating.

A stream nozzle with a plug-in attachment for producing a plug-type connection to the nozzle stock or inner tube of the torch is also covered with the silver coating on the fitting faces of the plug-in attachment.

Other metal spraying methods are naturally also practicable for applying the silver coating.

Embodiments of the subject of the invention will now be described in conjunction with the drawing, noting that the two embodiments shown are merely a non-limiting selection from among more embodiments.

Figure 2:
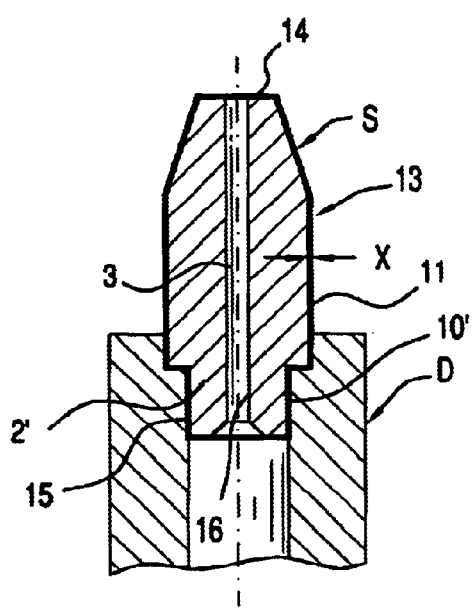

Shown are:

FIG. 1, a longitudinal section through a torch head with one embodiment of a stream nozzle; and FIG. 2, a longitudinal section through part of a torch head, with another embodiment of a stream nozzle.

In a torch head K of an inert gas welding torch B in FIG. 1, an inner tube 1 of the torch, on its free end, has a male thread onto which a nozzle stock D is mounted detachably, in the embodiment shown. On an outer tube 4 of the torch, there is a seat 5 for a gas nozzle orifice 6. Between the inner tube 1 and the outer tube 4, insulators 7 are provided, usually of nonmetal material.

The nozzle stock D, as a sleeve 8, is equipped with nozzle bores 9 and a front female-thread portion 10 for screwing a stream nozzle 13 into it. The stream nozzle 13, which for instance comprises electrolyte copper or a copper-chromium-zirconium alloy, is screwed with a screw attachment 2 into the female thread 10 and is thus secured replaceably. Extending through the stream nozzle 13 is an electrode wire delivery conduit 3, which discharges at a free end face 14; the end face 14 is optionally slightly recessed relative to the end of the orifice 6. Between where the stream nozzle 13 is mounted on the nozzle stock D and the end face 14, there is an outer jacket region 11.

A coating S of silver is applied over the full surface and adhering by material engagement, at least to the jacket region 11 and the end face 14. Expediently, this is a galvanically applied contact silver. However, the coating S can also extend as far as the screw attachment 2 and even on into the duct 3.

In FIG. 2, in a further embodiment of the stream nozzle 13, a plug-type connection is provided. The stream nozzle 13 has a plug-in attachment 2' with fitting faces 15 that fit corresponding fitting faces 10' of the nozzle stock D.

In both embodiments, the mounting of the stream nozzle 13 on the nozzle stock D is shown. It is also conceivable for the stream nozzle 13 to be mounted directly on the inner tube 1, correspondingly modified, of the torch.

In FIG. 2, the coating S is embodied of silver, preferably galvanically applied contact silver, in such a way that it covers the entire surface of the stream nozzle 13; that is, it covers the end face 14, jacket face 11, and fitting faces 15. The layer thickness X of the coating S is expediently between 2 and 15 µm, and preferably between about 6 and 10 µm.

For applying the silver coating, a plurality of stream nozzles 13 in the bare state, optionally after conventional precleaning processes are placed in a galvanic bath, until the silver coating S has been applied to the desired layer thickness.

In order to improve the anti-adhesive effect of the silver coating S at least temporarily, the possibility exists of spraying on a parting agent, typically an oily substance, which contains additives with which the surface of the silver coating S is passivated, which enhances the anti-adhesion effect.

The silver coating, extending as far as the inside of the mounting region of the stream nozzle 13 to the nozzle stock D or the inner tube 1 of the torch and existing over the full surface in this region as well, improves the current transfer in an optimal way.

What is claimed is:

1. A welding torch (B) for inert gas welding, having on its inside a nozzle stock (D) on whose end portion pointing toward the welding region a hollow stream nozzle (13) is mounted, wherein on at least a portion of the surface of the stream nozzle (13), a metal anti-adhesive and reflective coating is provided, characterized in that the coating (S) has silver as its main ingredient and in that the silver coating (S) has an essentially constant layer thickness (X) of between 2 and 15 µm.

2. The welding torch of claim 1, characterized in that the coating (S) comprises galvanically or chemically applied contact silver.

3. The welding torch of claim 1, characterized in that the silver coating (S) has an essentially constant layer thickness (X) of between 6 and 10 µm.

4. The welding torch of claim 1, characterized in that the coating (S) is provided on the jacket face (11), adjacent to the region where the stream nozzle (13) is mounted on the nozzle stock (D), and on the free end face (14) of the stream nozzle (13).

5. The welding torch of claim 1, characterized in that the coating (S) is provided on the entire surface of the stream nozzle (13).

6. The welding torch of claim 5, characterized in that the stream nozzle (13) has a screw attachment (2), whose male thread also has the coating (S).

7. The welding torch of claim 5, characterized in that the stream nozzle (13) has a plug-in attachment (2'), whose fit face or faces (15) also have the coating (S).

8. A stream nozzle (13) for an inert gas welding torch (B), which has a wire duct (3) extending longitudinally through from a mounting point to an end face (14), and over at least a portion of its surface, it has a metal coating adhering firmly by material engagement, characterized in that the coating (S) comprises galvanically or chemically applied contact silver and in that the silver coating (S) has an essentially constant layer thickness (X) of between 2 and 15 µm.

9. The stream nozzle of claim 8, characterized in that the silver coating (S) has an essentially constant layer thickness (X) of between 6 and 10 µm.

10. A welding torch (B) for inert gas welding, having on its inside a nozzle stock (D) on whose end portion pointing toward the welding region a hollow stream nozzle (13) is mounted, wherein on at least a portion of the surface of the stream nozzle (13), a metal anti-adhesive and reflective coating is provided, characterized in that the coating (S) has silver as its main ingredient and in that the coating (S) is provided on the jacket face (11), adjacent to the region where the stream nozzle (13) is mounted on the nozzle stock (D), and on the free end face (14) of the stream nozzle (13).

11. A welding torch (B) for in rt gas welding, having on its inside a nozzle stock (D) on whose end portion pointing toward the welding region a hollow stream nozzle (13) is mounted, wherein on at least a portion of the surface of the stream nozzle (13), a metal anti-adhesive and reflective coating is provided, characterized in that the coating (S) has silver as its main ingredient and in that the coating (S) is provided on the entire surface of the stream nozzle (13) and in that the stream nozzle (13) has a screw attachment (2), whose male thread also has the coating (S).

12. A welding torch (B) for inert gas welding, having on its inside a nozzle stock (D) on whose end portion pointing toward the welding region a hollow stream nozzle (13) is mounted, wherein on at least a portion of the surface of the stream nozzle (13), a metal anti-adhesive and reflective coating is provided, characterized in that the coating (S) has silver as its main ingredient and in that the coating (S) is provided on the entire surface of the stream nozzle (13) and in that the stream nozzle (13) has a plug-in attachment (2'), whose fit face (or faces) (15) also have the coating (S).

13. A stream nozzle (13) for an inert gas welding torch (B), which has a wire duct (3) extending longitudinally through from a mounting point to an end face (14), and over at least a portion of its surface, it has a metal coating adhering firmly by material engagement, characterized in that the coating (S) comprises galvanically or chemically applied contact silver and in that the coating (S) is provided on the jacket face (11), adjacent to the region where the stream nozzle (13) is mounted on the nozzle stock (D), and on the free end face (14) of the stream nozzle (13).

14. A stream nozzle (13) for an inert gas welding torch (B), which has a wire duct (3) extending longitudinally through from a mounting point to an end face (14), and over at least a portion of its surface, it has a metal coating adhering firmly by material engagement, characterized in that the coating (S) comprises galvanically or chemically applied contact silver and in that the coating (S) is provided on the entire surface of the stream nozzle (13) and in that the stream nozzle (13) has a screw attachment (2), whose male thread also has the coating (S).

15. A stream nozzle (13) for an inert gas welding torch (B), which has a wire duct (3) extending longitudinally through from a mounting point to an end face (14), and over at least a portion of its surface, it has a metal coating adhering firmly by material engagement, characterized in that the coating (S) comprises galvanically or chemically applied contact silver and in that the coating (S) is provided on the entire surface of the stream nozzle (13) and in that the stream nozzle (13) has a plug-in attachment (2'), whose fit face (or faces) (15) also have the coating (S).

* * * * *